United States Patent [19]

Ahuja

[11] 4,189,767

[45] Feb. 19, 1980

[54] ACCESSING ARRANGEMENT FOR INTERLEAVED MODULAR MEMORIES

[75] Inventor: Sudhir R. Ahuja, Matawan, N.J.

[73] Assignee: Bell Telephone Laboratories, Incorporated, Murray Hill, N.J.

[21] Appl. No.: 912,369

[22] Filed: Jun. 5, 1978

[51] Int. Cl.[2] ........................ G06F 13/00; G06F 7/38; G11C 8/00

[52] U.S. Cl. .................................................... 364/200

[58] Field of Search ... 364/200 MS File, 900 MS File, 364/746, 715

[56] References Cited

U.S. PATENT DOCUMENTS

| | | | |
|---|---|---|---|
| 3,813,652 | 5/1974 | Elmer et al. | 364/200 |
| 3,949,378 | 4/1976 | Crabb et al. | 364/200 |
| 3,980,874 | 9/1976 | Vora | 364/746 |
| 4,025,903 | 5/1977 | Kaufman et al. | 364/200 |
| 4,041,290 | 8/1977 | Fressineau et al. | 364/200 X |
| 4,051,551 | 9/1977 | Lawrie et al. | 364/200 |
| 4,064,400 | 12/1977 | Akushsky et al. | 364/746 |
| 4,124,893 | 11/1978 | Joyce et al. | 364/200 |

*Primary Examiner*—Melvin B. Chapnick
*Attorney, Agent, or Firm*—John F. Moran

[57] ABSTRACT

An address translator, which is designated to operate in a fraction of the memory cycle time, and associated modular organized memory accepts logical addresses and converts each to a corresponding physical address. Each physical address uniquely identifies a particular module and a particular storage location therein for data transfer. The overall structure is adaptable for full utilization of a variable number of modules occasioned by failure thereby providing a soft fail feature. The access time provided by the address translator and associated modules remains constant independent of the storage location being used. Adaption for accommodating changes in the number of modules is provided by altering the parameters of the address translation and changing the identification constants associated with each module.

10 Claims, 6 Drawing Figures

ACCESSING ARRANGEMENT FOR INTERLEAVED MODULAR MEMORIES

BACKGROUND OF THE INVENTION

This invention relates to memory systems. More particularly, the invention relates to an adaptable high speed arrangement for accessing individual storage locations among an arbitrary plurality of memory modules in an interleaved memory system.

Fast accessing of memory is essential to realize the full benefit of high speed central processing units (CPUs). A common technique to increase the quantity of information or data available in a given unit of time is to use parallel memory architecture. Since there are a plurality of memory units in such memories, it enables access to a number of storage locations each in different memory modules at the same time or in rapidly successive intervals. Because addresses are usually in binary form, it is most convenient to constrain the number of modules in a parallel organized memory to a power of two. To gain access to individual storage locations, the logical addresses supplied by the CPU may then be simply partitioned to identify a module and a particular storage location. However, a failure of one memory module reduces the address space to half of the original memory size with a corresponding decrease in the number of available memory modules for storage.

A possible variation in this approach is to perform some kind of address translation so that the number of memory modules may be any arbitrary number rather than being limited to a power of two. However, since access to the individual storage locations requires its own particular address translation, the time required for such a translation is critical. In other words, the translation arrangement should operate at a high enough speed so that the limiting factor in providing access to the memory is primarily the memory cycle time rather than the speed of the translation arrangement. In an interleaved memory system, a fast acting address translator is able to access successive locations in different memory modules rapidly to provide a pipelining effect wherein the total access time of the memory is essentially that of one memory cycle time although a plurality of storage locations each in a different memory module are being individually accessed.

An object of this invention is to provide an address translator readily adaptable to high-speed circuit techniques.

Another object is to provide an address translator adaptable to any arbitrary number of memory modules not constrained to being any exponential value.

Another object is to provide an address translator and associated memory accessing circuitry of minimal complexity and low cost.

SUMMARY OF THE INVENTION

The invention broadly takes the form of an address translator and a preselected plurality of M memory modules each connected to receive the output of the translator. The translator receives a physical address and produces an internal physical address by performing computation using the received address and the number of modules to produce a quotient including a residue. The value of the quotient is increased by a predetermined constant to provide the physical address. In the internal physical address, a predetermined portion serves to identify a particular module by being compared to two predetermined limits while the other portion identifies the individual storage location in the accessed module.

In some of the more specific aspects of the invention, the mathematical computation is a division of the logical address by the particular value of M. The logical address includes an n bit level signal and its division is actually performed by a multiplication by a factor indicative of the reciprocal of M. The factor includes $(n+2)$ bits and the quotient output with the residue includes $(n+1)$ bits. To maintain a low memory access time, the comparisons to the two predetermined limits are done concurrently. The difference between these limits for each module is $2^{-(k+1)}$ where k is the ceiling function of the logarithm of the value of M to the base 2. The values of the first or lower limit for each module j from $j=0$ to $j=M-1$ are the values of the fraction j/M for each of the values of j and the fractional values are in $(k+1)$ bits. The comparators using the limits produce a first level output signal to indicate a match between one of the limits and the predetermined portion of the physical address. Logic circuitry which receives the other portion of the physical address at each module enables access to a memory module in response to the first level output of the comparator at an individual storage location in accordance with the complete physical address.

BRIEF DESCRIPTION OF THE DRAWING

A more complete understanding of the invention and the various features, additional objects and advantages thereof may be more readily appreciated and better understood by reference to the following detailed description in conjunction with the drawings.

DETAILED DESCRIPTION

Figure 1:
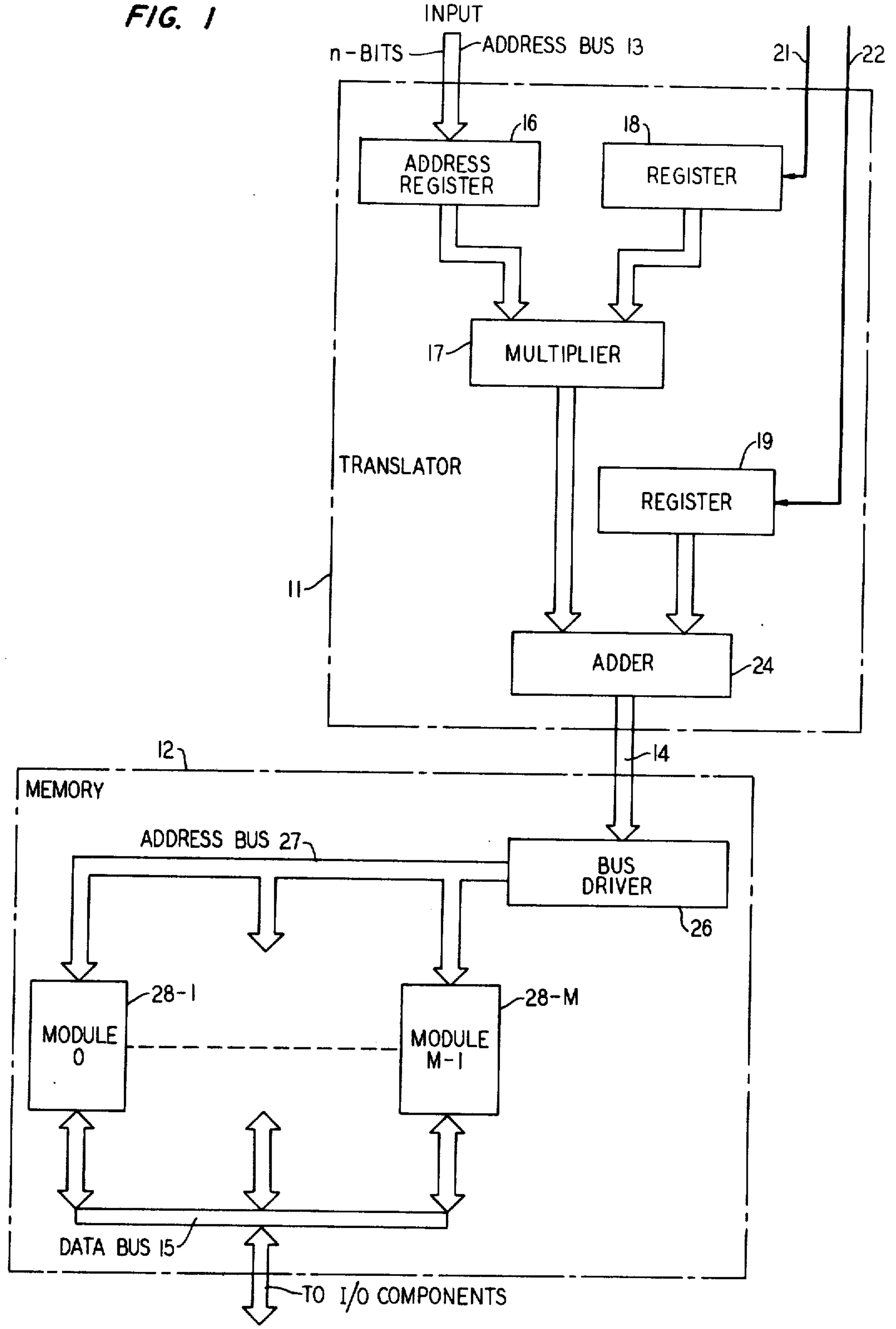
FIG. 1 is a diagram of apparatus arranged in accordance with the invention.

FIG. 1 provides the overall arrangement basically of an address translator 11 and a parallel organized modular memory 12, which together embody the inventive principles. Address translator 11 accepts any physical address within a predetermined address field at bus 13 and provides a uniquely corresponding internal physical address on output bus 14 indicative of a particular storage location within one of the modules of memory 12. The address translation time of translator 11 is designed to be a fraction of a memory cycle time. This relationship enables a reduction in data transport time between memory 12 and a CPU particularly when there is a successive stream of memory accesses at locations in different modules which is characteristic of interleaved memories. Bus 15 is the data path for reading information into memory 12 and for obtaining information from the memory. Typically associated with data bus 15, but not shown for the sake of simplicity, would be a bus controller, an input/output controller, and a CPU which would also provide the address information for bus 13.

Within translator 11, address register 16 accepts the physical address present on bus 13 and presents same to one input of multiplier 17. The other input to multiplier 17 is provided by register 18. At this time, it is pointed out that register 18 and another register 19 each contain a prestored constant, loaded via respective lines 21 and 22, determined in accordance with the number of modules M within memory 12. In this case, the number of address bits in the logical address present on bus 13 is n while the value of the constant in register 18 is 1/M the reciprocal of M modules, represented in binary to an accuracy of (n+2) bits.

Multiplier 17 accepts these two inputs to produce an output product on its bus output in the form of (n+1) bit level signals. This output and the output of register 19 provide the inputs to adder 24. The value of the constant in register 19 is $2^{-(k+1)}$ which is a correction factor since the multiplication of 1/M times the physical address of n-bits is actually a division by M whose value may be an approximation. Accordingly, the output of multiplier 17 is a quotient which includes a remainder or residue. This implementation is used to obtain speed since hardware multipliers work faster than dividers. The value of k in the correction factor expression is $[\log_2 M]$ or the ceiling function of the logarithm of M to the base 2. The correction factor present in the form of (n+1) bit level signals on the output of register 19 provides a positive error which dominates the actual error whose value is known to fall within the range of the constant in register 19.

The output of adder 24 on bus 14, therefore, comprises an integer plus a remainder. The leading bits of (n−k) of this output is the integer value that provides the offset address or storage location within an otherwise selected module. The error which primarily affects the remaining bits due to the addition of the correction factor selects the particular module. It should be pointed out, however, that in this arrangement each module may be selected by either of two number values assigned to it, since the error is still present in the remainder portion which serves to select a module for storage. In the illustrative embodiment, the remainder portion of the physical address is compared to the two values of the module at the same time, so that the two comparisons are done concurrently in parallel and do not require any greater time than a single comparison.

Consideration will now be given to the mathematical basis of this arrangement before the description proceeds with additional circuitry details. If A denotes the physical address applied to bus 13 and u denotes the corresponding module number while v denotes the offset address or particular storage location within the module, then $$u = A \text{ modulo } M \qquad (1)$$

$$v = \left\lfloor \frac{A}{M} \right\rfloor \text{ (brackets indicate floor function)} \qquad (2)$$

where M as previously stated is the number of modules (or banks) in memory 12. Thus, u and v are distinct bit quantities represented by signals on bus 14. In particular, u is the remainder and v is the integer which are each represented by a plurality of bit level signals in their respective portions of bus 14.

In memory 12, bus driver 26 accepts the address signal on input bus 14 and produces a corresponding output on bus 27. Bus 27 is connected to the address inputs of each of modules 28-1 through 28-M. The internal circuitry of each of these modules will be described in connection with FIG. 4. Each of modules 28 has a data port capable of either accepting or delivering data to input/output data bus 15. This data information is produced or received by storage locations specified by the address information supplied to bus 13 at the input of translator 11.

Figure 2:
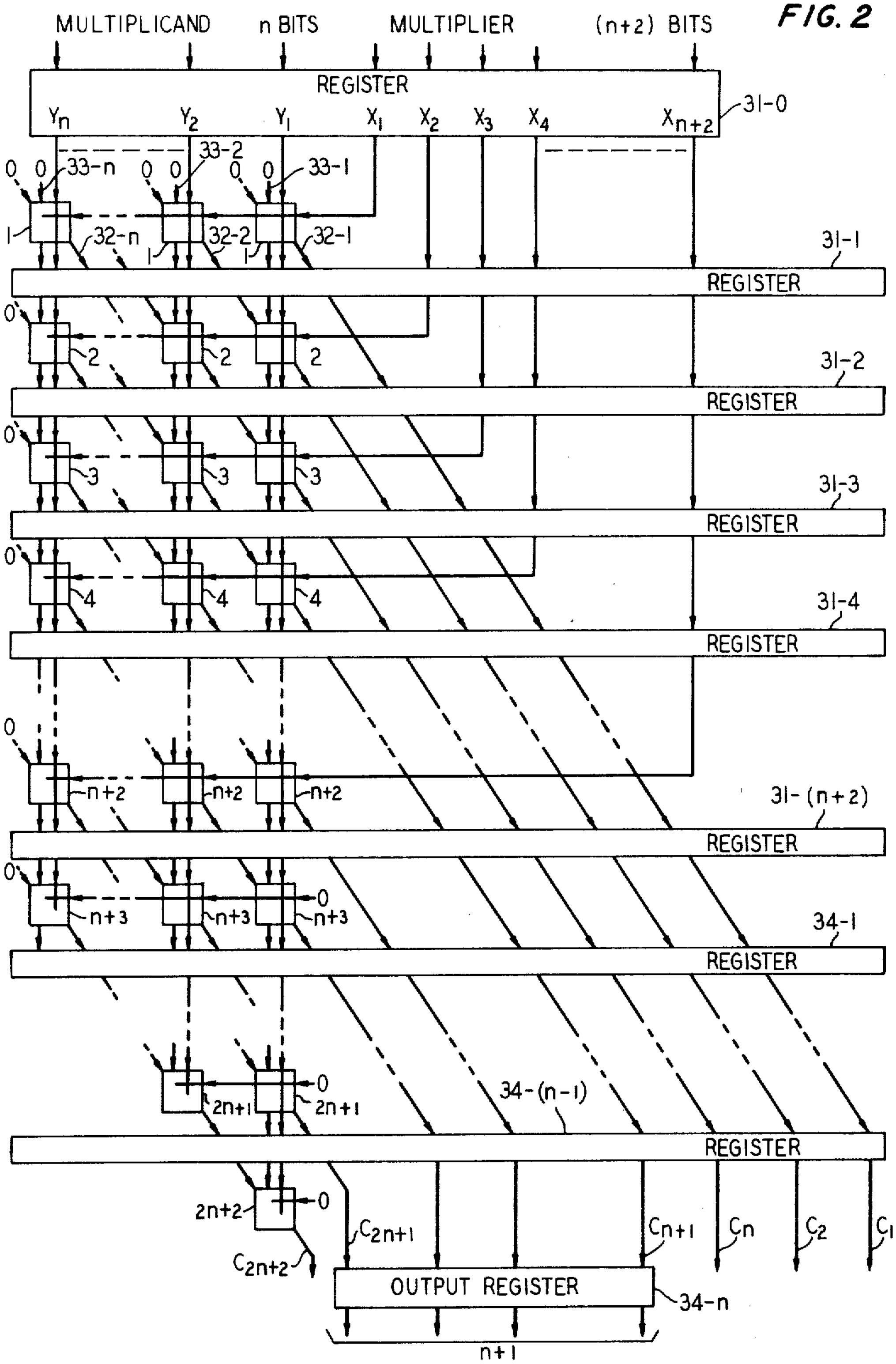
FIG. 2 is a detailed diagram of the multiplier generally shown in the arrangement of FIG. 1.

FIG. 2 illustrates a high speed pipelined multiplier, in generalized form, particularly suitable for the function provided by multiplier 17 in FIG. 1. As can be seen FIG. 2 includes an expandable array for any positive integer value of n of basic identical multiplier cells which are illustrated in further detail by FIG. 3. One basic input to the multiplier of FIG. 2 is the multiplicand which includes n parallel bit level signals on separate conductors of the output bus of register 16. These bit level signals are each individually applied to one of inputs $Y_1$ through $Y_n$. The other basic input of the multiplier includes $X_1$ through $X_{n+2}$ parallel bit level signals from register 18 FIG. 1. All of the inputs are gated into register 32-0 via a clocking arrangement (not shown) which activates all the registers of FIG. 2 in unison. The outputs of register 31-0 are applied to the multiplier cells in the first row and to register 31-1 as illustrated in FIG. 2.

In addition to the outputs of register 31-1, each of the basic multiplier cells in the first row of the multiplier of FIG. 2 also has a sum and a carry input. The carry conductors run vertically and are designated 32-1 through 32-n while the sum conductors run diagonally and are labeled 33-1 through 33-n. The initial input to each of these conductors is a "0" level signal. Each of the cells also produces two outputs for the next successive register, i.e., register 31-2 for the first row of cells. In operation, the registers in FIG. 2 are clocked in unison at intervals spaced slightly in excess of the propagation delay produced by the operation of a single one of the cells in FIG. 2. The general configuration of the multiplier in FIG. 2 is known as a pipelined carry save multiplier wherein the first n+2 rows actually perform the multiplication function exclusive of the carrying function. The remaining registers 34-1 through 34-n and associated multiplier cells in the lower triangular portion of FIG. 2 provide the carry function in accordance with the general pipelined operation performed by the arrangement of FIG. 2. Selective utilization here of the outputs of the multiplier eliminates the need for "0's" to establish the decimal point in the multiplier constant.

Figure 3:
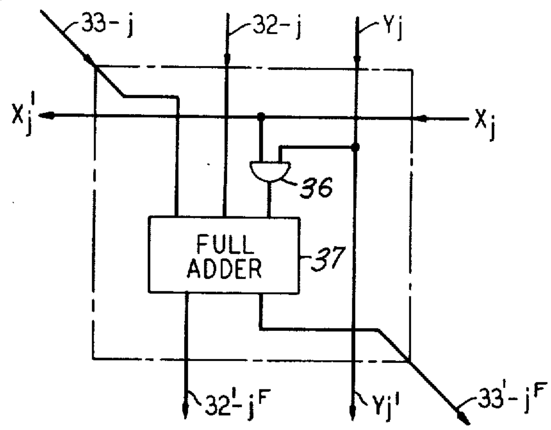
FIG. 3 is a detailed diagram of a typical multiplier cell utilized in the multiplier of FIG. 2.

FIG. 3 illustrates the internal arrangement of a basic cell which includes AND gate 36 and full adder 37. The two inputs of AND gate 36 are a single multiplier signal $X_j$ and a single multiplicand bit signal $Y_j$. The output of AND gate 36 is applied to full adder 37. The other inputs to adder 37 are the bit signal on conductor 32-j indicative of previous carry and the bit signal on conductor 33-j indicative of the previous sum. In accordance with these signals, full adder 37 produces an output on conductor 32'-j indicative of the carry and on conductor 33'-j indicative of the sum. Reference numerals of conductors applying signals to the basic cell of FIG. 3 do not have the prime designation while those for output signals produced by the basic cell of FIG. 3 are designated with primes.

Figure 4:
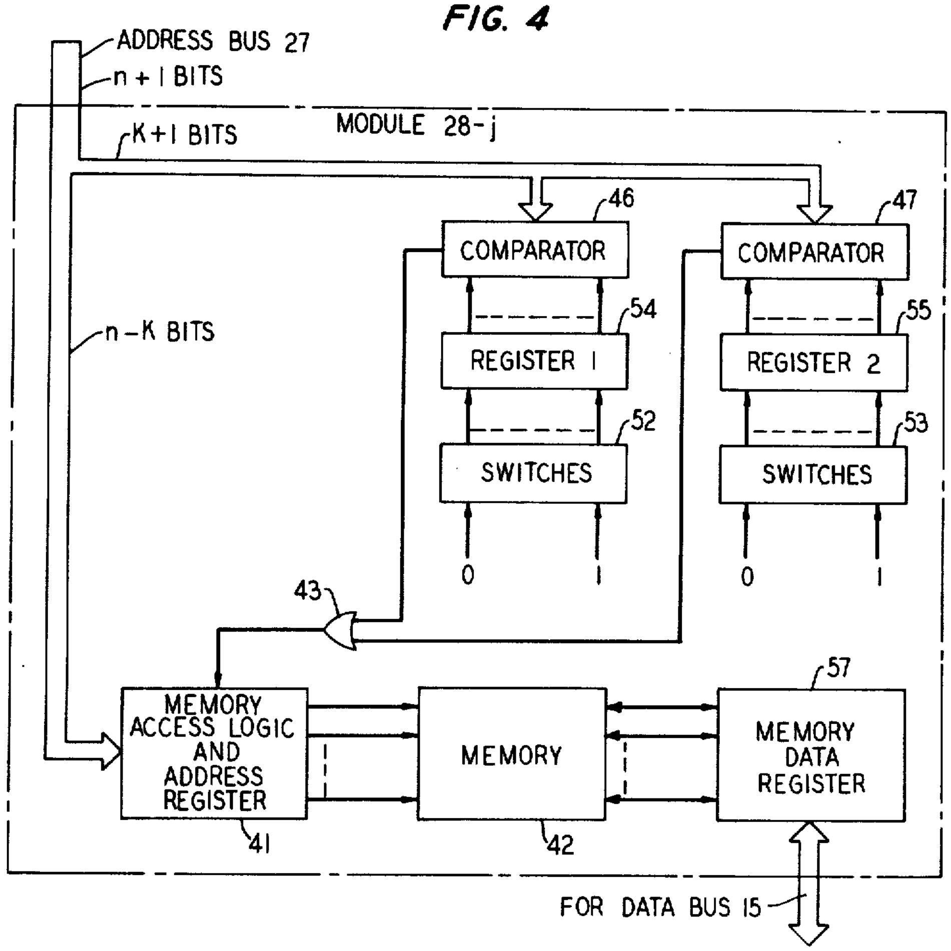
FIG. 4 illustrates the arrangement of a typical module which may be employed in the memory portion of FIG. 1.

FIG. 4 illustrates the arrangement utilized within one of modules 28 of FIG. 1. These modules are all identical and are each provided n+1 bit level signals from address bus 27. The data port of these modules either accepts or applies information from or to data bus 15 in accordance with the address information from translator 11 of FIG. 1.

The group of bit level signals on address bus 27 comprises the complete internal physical address. The internal physical address includes the leading n−k bit level signals which are applied to memory access logic and address register 41. The value of these bit level signals is an integer which indicates the offset address indicative of the particular storage location which may be utilized in memory 42. The output of OR gate 43 serves as a control by providing an enabling input to the logic portion of register 41 in response to a "1" level output from either one of comparators 46 and 47.

The address signal input to comparators 46 and 47 includes the remaining bit level signals from address bus 27 which are k+1 in number. Connected to comparator 46 is switch 52 which is coupled to and register 54 while switch 53 register 55 provide the reference input for comparator 47. Switches 52 and 53 each have an "0" or a "1" level signal input and a k+1 plurality of outputs that correspond to either one of these two input levels in accordance with the manner these switches are set. Thus, each of registers 54 and 55 is provided a plurality of k+1 bit level signals from the outputs of switches 52 and 53 for storage therein. The value of these binary signals serves to provide each module with a unique identification to which the remainder portion of the physical address is compared. When the applied portion of the internal physical address corresponds to one of the two inputs to comparators 46 and 47, the particular comparator in which the match occurs will produce a "1" level output signal. This signal will pass through OR gate 43 and enable register 41 for the passage of the n−k bit level signals to memory 42. At this time, data may be read into or read out of memory 42 at a storage location corresponding to the value of the offset address. The data then is transferred between the specified storage location of memory 42 and memory data register 57, which is coupled to data bus 15.

The determination of the values stored in registers 46 and 47 is dependent upon the value of M, the number of modules utilized in memory 12. This also affects the size of the physical address field; i.e. n whose number of possible binary values is at least as large as the product of the number of storage locations available in each module and the value of M. If M=8 and each module is capable of storing 16 words, there is a total of 128 storage locations. Therefore, $n=[\log_2 128]=7$ so that each physical address includes 7-bits. The value of k is $[\log_2 M]=3$.

The internal physical address is n+1 or 8-bits of which the leading (n−k) or 4-bits is the offset address applied to registers 41 in each module of FIG. 4 while the remaining k+1 or 4-bits is the remainder indicative of the module number. This portion of the address is applied to comparator 46 and 47 in each module. The value of the constants loaded into register 18 of translator 11 of FIG. 1 corresponds to 1/M=0.00100000000 and the value of constant for register 19 of the translator corresponds to $2^{-(k+1)}=2^{-(4)}=0.0001$ in binary or the base two. Only a total of n+2 or 9-bits is stored in register 18 since leading zeroes that merely locate the decimal point may effectively be represented by selective utilization of the input and outputs of the components of FIG. 1. The capacity of register 19 and the associated constant are n+1 bits. It is also to be noted that the constants correspond to exact powers of two in this case. However, typically this will not occur so that the constants which are always powers of two provide approximations of values that are not an exact power of two.

In order for memory 12 of FIG. 1 to operate, each of modules 28 must be provided with a unique range of values which actually take the form of two preselected limits since the binary signal representations are rounded off or truncated approximations of the mathematical operations. Table 1 lists the values stored in the equivalent of registers 54 and 55 for each module in accordance with FIG. 4.

TABLE 1

| Module j | j/M | Register 54. | Register 55 |
|---|---|---|---|
| 0 | 0/8 | .0000 | .0001 |
| 1 | 1/8 | .0100 | .0011 |
| 2 | 2/8 | .0100 | .0101 |
| 3 | 3/8 | .0110 | .0111 |
| 4 | 4/8 | .1100 | .1001 |
| 5 | 5/8 | .1010 | .1011 |
| 6 | 6/8 | .1100 | .1101 |
| 7 | 7/8 | .1110 | .1111 |

The particular settings of the pair of switches 52 and 53 provide the respective inputs for the pair of registers 54 and 55 in each of modules 0 through 7. It should be pointed out that all of the constants in accordance with Table 1 including those in registers 18 and 19 remain fixed and are used in the process of providing an address translation to access each of the 18 individual storage locations present in all of the modules.

The versatility of the arrangement of FIG. 1 is demonstrated in the situation involving the failure of one or more modules. If one module fails, then 1/M=1/7=0.001001001 and the values of the new constants for the pair of registers associated with each module are listed in Table 2. With these new constant values, the translator of FIG. 1 is now able to provide rapid address translations for any of the individual storage locations of all seven modules.

TABLE 2

| Module j | j/M | Register 54 | Register 55 |
|---|---|---|---|
| 0 | 0/8 | .0000 | .0001 |
| 1 | 1/8 | .0010 | .0011 |
| 2 | 2/8 | .0100 | .0101 |
| 3 | 3/8 | .0110 | .0111 |
| 4 | 4/8 | .1001 | .1010 |
| 5 | 5/8 | .1011 | .1100 |
| 6 | 6/8 | .1101 | .1110 |

Tables 3 and 4 list additional values of constants respectively for M=6 and M=5. The value stored in register 18 will now be 0.001010101 for M=6 and 0.001100110 for M=5. These constants are power of two approximations of the reciprocal of M as was also true for Table 2 for which the value of M was seven.

TABLE 3

| Module j | j/M | Register 54 | Register 55 |
|---|---|---|---|
| 0 | 0/6 | .0000 | .0001 |
| 1 | 1/6 | .0010 | .0011 |
| 2 | 2/6 | .0101 | .0110 |
| 3 | 3/6 | .1000 | .1001 |
| 4 | 4/6 | .1010 | .1011 |
| 5 | 5/6 | .1101 | .1110 |

TABLE 4

| Module j | j/M | Register 54 | Register 55 |
|---|---|---|---|
| 0 | 0/5 | .0000 | .0001 |
| 1 | 1/5 | .0011 | .0100 |

TABLE 4-continued

| Module j | j/M | Register 54 | Register 55 |
|---|---|---|---|
| 2 | 2/5 | .0110 | .0111 |
| 3 | 3/5 | .1001 | .1010 |
| 4 | 4/5 | .1100 | .1101 |

For Tables 1-4, the value of the constant in register 19 remained the same since its value is $2^{-(k+1)}$ and $k=[\log_2 M]=3$ for M=8, 7, 6 and 5.

The foregoing tables illustrate that the arrangement of FIG. 1 will provide a unique internal physical address in response to each value of a given physical address independent of the value of M. Another feature of this arrangement is that the translation of an external physical address to a corresponding internal physical address is constant for each of the specified values of M and for any of the storage locations among any one of the working modules. In each case, the constants for registers 18 and 19 are applied via conductors 21 and 22 while the equivalent of switches 52 and 53 are set in each of the working modules as listed in the appropriate one of Tables 1-4. Of course, those skilled in the art may utilize an arrangement for remotely programming the values in the equivalent of registers 54 and 55. Such an arrangement may employ logic circuitry connected to address bus 27 so that it provides the access to the equivalent of registers 54 and 55 in each module.

For any desired number of modules, the identity constants for the comparators of the modules may be readily computed through binary long division. If there are a total of M modules, the smaller constant is the value of j/M to an accuracy of (k+1) bits. The upper limit is then established by adding $2^{-(k+1)}$ also expressed to the (n+1) bit accuracy of the lower limit. A table of dual values may then be calculated for each value of j from 0 through M-1.

The application of these principles is therefore not limited to any value of M, but for each value of M and the number of storage locations in each module consideration must be given to a number of factors. The bit capacity of the arrangement of FIG. 1 must be adequate for the field of the physical addresses. The storage capacity of registers 18, 19 and then the equivalent of registers 54 and 55 in each module must be consistent with this capacity. Naturally, the address bus is required to provide the appropriate number of conductive paths for the plurality of bit level signals utilized to achieve the requisite unique binary signal address combinations. After translator 11 and memory 12 are designed to operate for a preselected complement of working memory modules, the capacity of the designed arrangement will readily accommodate any decrease in the number of working modules simply by providing appropriate changes in the constants for the translator and also the limits of the unique ranges assigned to the individual modules. Since the overall structure remains the same, its inherent flexibility produced by changes in the values of constants is an advantage which enables full module utilization notwithstanding that their number is reduced. The numbers of bits utilized in this description for specified constants, input, and output quantities represent the minimum accuracy to provide rapid and reliable performance and, of course, greater accuracy may be desired in particular applications.

In the implementation of this arrangement, various integrated circuits were selected primarily for their speed of operation. For example, the multiplier in the translator was built with TRW No. TDC 1008J 8-bit bipolar multiplier integrated circuits. Integrated circuits from Texas Instruments of the transistor-transistor logic variety were used for other components. SN 7483 4-bit adders provided the adder function in the translator. In the realization of FIG. 4, SN 74S85 4-bit comparators were used in the modules while combinations of 74S174 6-bit registers and 74S174 4-bit registers were used to store the identification constants of each module.

Although the invention and numerous features thereof have been described in connection with accessing a read/write memory or so-called random access memory, it is to be understood that the inventive principles may be readily applied to read-only-memories and that other applications of these principles obvious to those skilled in the art are included within the spirit and scope of the invention. Furthermore, the arrangement disclosed in the foregoing is merely illustrative of the application of these inventive principles. The multiplier herein disclosed may take other forms of high speed multipliers or possibly dividers wherein, for example, a look-ahead-carry technique is employed. Another consideration is adaption of these inventive principles to integrated circuit technology wherein numerous modifications may be made in the interest of efficient implementation.

What is claimed is:

1. A modular memory system having a plurality of M modules each including a plurality of storage locations wherein each of the individual storage locations in the system is capable of being uniquely accessed via the occurrence of an external physical address, the system comprising:

translating means for converting each external physical address to an internal physical address, said translating means comprising first means connected to receive each external physical address and performing a mathematical computation thereon using the value of M to produce an output indicative of a whole number and a residue, and second means connected to receive said output and increasing same by a predetermined constant of $2^{-(k+1)}$ where $k=[\log_2 M]$ to provide the internal physical address including an integer portion and a fractional portion for selecting an individual storage location;

said plurality of M modules includes a preselected arbitrary number of modules and each of the modules comprises comparing means, connected to receive the fractional portion of the internal physical address, having two predetermined values exclusive to each module for comparing to its received fractional portion, the comparing means of a particular module responsive to the occurrence of the fractional portion corresponding to one of said predetermined values by producing an enable output, and logical means for each module connected to receive the integer portion of the internal physical address and the output of its corresponding comparing means, the logical means, at a particular module, providing access thereto in response to the occurrence of an enable output and at a storage location indicated by the value of the integer portion.

2. A modular memory system in accordance with claim 1 wherein said first means divides the external physical address by the value of M.

3. A modular memory system in accordance with claim 2 wherein the external physical address includes an n bit level signal and said first means comprises means for storing a factor indicative of the reciprocal of M to produce an output constant indicative of same, and multiplying means, connected to said storing means, for receiving the output constant and the external physical address to produce the output of said first means indicative of a whole number and a residue.

4. A modular memory system in accordance with claim 3 wherein said means comprises a plurality of cells for storing each one of the (n+2) bits and the output includes (n+1) bits.

5. A modular memory system in accordance with claim 4 wherein said comparing means includes first and second comparators, each connected for concurrently receiving the fractional portion of the internal physical address thereby keeping the time for accessing an individual storage location to the same value that includes a single comparison.

6. A modular memory system in accordance with claim 5 wherein the difference between said two predetermined values for each module is $2^{-(k+1)}$ where k is the ceiling function of the logarithm of the value of M to the base 2.

7. A modular memory system in accordance with claim 6 further comprising retaining means, connected to said first and second comparators, for storing each of said two predetermined values to provide an individual reference value for each of said first and second comparators and wherein the value of the first of said two predetermined values for each module j from j=0 to j=M−1 are the values of the fraction j/M for each of the values of j and the fractional values are each expressed in (k+1) bits in said retaining means.

8. A modular memory system in accordance with claim 7 wherein said first and second comparators each produce a first level output signal to indicate a match between one of said reference values and the predetermined portion of said physical address.

9. In a modular memory system including any arbitrary number M of modules each having the same plurality of individual storage locations, apparatus connected to receive external physical address signals in a successive sequence to provide substantially uniformly distributed access to all of said modules throughout the sequence, said apparatus comprising:

means for dividing each physical address by the value of M to produce a mixed number;

adding means, in circuit with said means for dividing, for increasing said mixed number by $2^{-(k+1)}$ where k is the ceiling function of the logarithm of M to the base two, said adding means having an output for producing an internal physical address including a whole number portion and a fractional portion;

busing means, connected to the output of said adding means, for distributing the internal physical address;

enabling means associated with each of said modules and connected to said busing means, each of said enabling means having two predetermined values distinct to each module, each of said enabling means comparing the fractional portion of the internal physical address to its two predetermined values for producing an enable output when a match between the fractional portion and one of said predetermined values occurs; and logic means associated with each of said modules connected to said busing means and said enabling means, said logic means providing access to an individual storage location in a module according to the value of the whole number portion of the internal physical address when said enable output occurs.

10. A modular memory system having a plurality of M modules each including a plurality of addressable storage locations wherein each of the storage locations is capable of being uniquely accessed externally by the occurrence of a distinct physical address, the system comprising:

means for receiving an input sequence of M successive physical addresses;

computation means, connected to said means for receiving, for using each physical address and the value of M to produce a quotient output indicative of a mixed number, said computation means producing a sequence of quotient outputs in response to said input sequence of M successive physical addresses;

adding means, connected to said computation means, for increasing each quotient output by a constant equal to the value of $2^{-(k+1)}$, where k is the ceiling function of the logarithm of M to the base two, to produce each internal physical address having a whole number portion and a fractional portion, said adding means producing a sequence of internal physical addresses in response to said input sequence of M successive physical addresses; and logical means associated with each of said modules and connected to receive each of said internal physical addresses, each of said logical means storing two predetermined constants distinct to each module for comparing the fractional portion of each internal physical address to produce an enable output when a match occurs, said logical means storing the whole number portion of an internal physical address upon the occurrence of the enable output produced in response to the accompanying fractional portion, said logical means then accessing the associated module at an addressable storage location determined by the value of the stored whole number portion, and the plurality of logical means in response to said input sequence of M successive physical addresses each providing access to a corresponding addressable storage location in a different one of each of said modules for each internal physical address so that the memory cycle intervals of the plurality of modules overlap thereby providing a substantially greater data for said modular memory system in response to said input sequence than for that of a separately occurring input physical address to access an individual storage location.

* * * * *

UNITED STATES PATENT AND TRADEMARK OFFICE

CERTIFICATE OF CORRECTION

PATENT NO. : 4,189,767

DATED : February 19, 1980

INVENTOR(S) : Sudhir R. Ahuja

It is certified that error appears in the above-identified patent and that said Letters Patent are hereby corrected as shown below:

Column 4, line 19, "32-0" should read --31-0--. Column 5, line 15, omit "and"; line 16, after "switch 53" add --and--. Column 6, line 33, the second occurrence "=" should read --$\tilde{=}$--.

Signed and Sealed this

*Tenth* Day of *June 1980*

[SEAL]

*Attest:*

SIDNEY A. DIAMOND

*Attesting Officer* *Commissioner of Patents and Trademarks*